US009116051B2

(12) United States Patent
Slavens et al.

(10) Patent No.: US 9,116,051 B2
(45) Date of Patent: Aug. 25, 2015

(54) ACTIVELY COOLED GAS TURBINE SENSOR PROBE HOUSING

(71) Applicant: United Technologies Corporation, Hartford, CT (US)

(72) Inventors: Thomas N. Slavens, Vernon, CT (US); Charles W. Haldeman, Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/134,603

(22) Filed: Dec. 19, 2013

(65) Prior Publication Data

US 2014/0254631 A1  Sep. 11, 2014

Related U.S. Application Data

(60) Provisional application No. 61/774,145, filed on Mar. 7, 2013.

(51) Int. Cl.
*G01K 1/12* (2006.01)
*G01D 11/24* (2006.01)
*G01K 13/02* (2006.01)

(52) U.S. Cl.
CPC .............. *G01K 1/12* (2013.01); *G01D 11/245* (2013.01); *G01K 13/02* (2013.01); *G01K 2013/024* (2013.01)

(58) Field of Classification Search
CPC ....... G01D 11/245; G01K 13/02; G01K 1/12; G01K 2013/024
USPC ....................................................... 73/112.01
See application file for complete search history.

(56) References Cited

U.S. PATENT DOCUMENTS

| | | | | |
|---|---|---|---|---|
| 4,480,930 | A | * | 11/1984 | DeZubay et al. ............. 374/134 |
| 4,747,700 | A | * | 5/1988 | Lenz et al. .................... 374/135 |
| 5,185,996 | A | * | 2/1993 | Smith et al. .................... 60/772 |
| 6,292,763 | B1 | | 9/2001 | Dunbar et al. |
| 6,595,062 | B1 | * | 7/2003 | Luke et al. ...................... 73/714 |
| 6,776,524 | B2 | * | 8/2004 | Park et al. ..................... 374/179 |
| 7,828,477 | B2 | * | 11/2010 | Benning et al. ............... 374/138 |
| 8,033,719 | B2 | * | 10/2011 | Beutin et al. .................. 374/158 |
| 8,082,727 | B2 | | 12/2011 | Roberge |
| 8,127,528 | B2 | | 3/2012 | Roberge |
| 2008/0285620 | A1 | * | 11/2008 | Benning et al. ............... 374/138 |
| 2009/0211221 | A1 | | 8/2009 | Roberge |
| 2012/0216608 | A1 | * | 8/2012 | Schleif et al. .............. 73/112.01 |
| 2012/0233980 | A1 | | 9/2012 | Heathco |
| 2012/0272656 | A1 | | 11/2012 | Norris |

* cited by examiner

*Primary Examiner* — Freddie Kirkland, III
(74) *Attorney, Agent, or Firm* — Miller Matthias & Hull LLP

(57) ABSTRACT

An actively cooled turbine sensor assembly is designed to withstand post-combustion gas-path conditions of gas turbine engines. The housing forms part of a cooling system and includes an elongated tubular structure that may be inserted into the hot flow path. The distal end portion of the sensor assembly is contoured to minimize heat transfer. The housing also includes leading and trailing plenums for flowing cooling air through the housing and out through the distal end portion. Additional side cavities may also be provided for active cooling of the sensor and reducing possible heat conduction paths to the sensor.

19 Claims, 3 Drawing Sheets

ACTIVELY COOLED GAS TURBINE SENSOR PROBE HOUSING

TECHNICAL FIELD

This disclosure relates generally to gas turbine engines, and specifically to sensor probes for measuring operating conditions in a combustion gas flow path through a turbine of a gas turbine engine.

BACKGROUND

Gas turbine engines suitable for use in aircraft type applications can presently be placed into one of three broad categories, namely turbojet, turbofan and variable cycle engines. Turbojet engines typically include a rotatable compressor, a combustor and a rotatable high pressure turbine which is connected to the compressor by a shaft to form a spool. In operation, the rotating compressor blades raise the temperature and pressure of air entering the turbojet engine. Fuel is mixed and burned with the air in the combustor. Some of the energy of the rapidly expanding gases exiting the combustor is converted by the turbine into rotation of the shaft which, in turn, rotates the compressor. The gases exit the turbojet engine through a nozzle such that the gases provide a force, or thrust, to the engine.

In contrast, turbofan engines typically include a fan assembly disposed upstream of two or more compressors that are each coupled to one of two or more turbines via coaxial shafts to form two or more coaxially nested spools. For example, a typical turbofan engine includes a low pressure compressor (LCP) coupled to a low pressure turbine (LPT) to form one spool. Downstream of the LPC is a high pressure compressor (HPC) coupled to a high pressure turbine (HPT) disposed upstream of the LPT to form another spool. The combustor is disposed between the HPC and HPT. The spools operate at different pressures and temperatures and rotate at different speeds. Further, in both turbojet and turbofan engines, individual compressors and turbines are subdivided into a number of stages, which are formed of alternating rows of rotor blades and stator vanes.

In a turbofan engine, a portion of the air passing through the fan assembly by passes the engine core and enters an outer air duct while the remaining air enters the LPC. The turbofan engine bypass ratio refers to the ratio of the air flow through the outer duct divided by the air flow though the turbofan engine core. High bypass ratio turbofan engines accelerate a very large mass of air to relatively low exhaust gas velocities. High bypass turbofan engines are better suited for low aircraft speeds where adequate specific thrust can be provided with reduced noise because of the lower exhaust gas velocities. In contrast, low bypass turbofan engines have low air mass flow rates and high exhaust gas velocities. Low bypass turbofan engines and turbojet engines are better suited for high aircraft speeds because of their high exhaust gas velocities.

A third category of aircraft gas turbine engines are known as variable cycle gas turbine engines, which combine the operational characteristics of turbojet or low bypass turbofan engines with the operational characteristics of high bypass turbofan engines. High performance variable cycle gas turbine engines are being designed because of their unique ability to operate efficiently at various thrust settings and flight speeds, both subsonic and supersonic. An important feature of the variable cycle gas turbine engine is its capability of maintaining a substantially constant inlet airflow as its thrust is varied. This feature leads to important performance advantages under less than full power engine settings or at maximum thrust conditions, such as during subsonic cruise.

For example, a variable cycle turbofan engine may include a core engine, first and second fans, and first and second fan bypass ducts. Both fans may have variable pitch inlet guide vanes and variable pitch stator vanes. By varying the pitch of the vanes in the first and second fans, the engine may operate in high bypass and low bypass modes, thereby providing a single engine which is efficient at both low and high aircraft flight speeds respectively. The outer duct walls may be provided with one or more inlets and discharge outlets which can provide additional air to the second fan assembly, depending upon the operational requirements of the engine. Further, U.S. Pat. No. 8,082,727 discloses a variable cycle gas turbine engine with a peripheral duct that receives peripheral inlet air, an auxiliary fan and an auxiliary turbine. The auxiliary turbine is connected to the aft end of the core engine and is configured to receive combustion gases for driving the auxiliary fan that receives air from the peripheral duct. Similarly, U.S. Pat. No. 8,127,528 includes an auxiliary combustor and an auxiliary propulsor or fan disposed in the peripheral duct. Other variable cycle engine designs have been developed and are too numerous to mention here.

Variable cycle engines, with modulated flow areas and geometries, can achieve higher efficiencies than current turbojet or turbofan engines. To optimize variable cycle engine configurations, higher fidelity sensor measurements must be made of the engine operation. The application and use of sensing probes within the hot gas-path environment of the turbine(s) would be highly desirable, and measurements made by such sensing probes could be used to optimally adjust engine parameters for the given speed or determining turbine integrity through active monitoring of airfoil temperatures.

Unfortunately, the maximum operating temperature of currently available sensors are hundreds to thousands of degrees lower than the combustion gas temperatures.

SUMMARY

In one aspect, a sensor assembly is disclosed. The sensor assembly may include an elongated housing that may include a proximal end and a distal end portion with a housing body disposed between the proximal end and the distal end portion. The proximal end of the housing may include an opening for accommodating the sensor. The sensor may extend through the housing body to the distal end portion of the housing. The distal end portion of the housing may include a port that extends generally radially through a trailing side of the distal end portion. The distal end portion may also include a leading side disposed diametrically opposite the port and the trailing side of the distal end portion. The leading side of the distal end portion may curve towards and terminate at the trailing side of the distal end portion and distally of the port to provide a contoured distal end to the elongated housing that faces the combustion gas flow.

In another aspect, a sensor assembly for a turbine of a gas turbine engine is disclosed. The sensor assembly may include an elongated housing that may include a proximal end and a distal end portion. A housing body may be disposed between the proximal end and the distal end portion. The proximal end of the housing may include an opening for accommodating a sensor. The sensor may be axially received through the housing body to the distal end portion of the housing. The elongated housing may include a leading side for engaging combustion gas flow and a trailing side that faces away from the combustion gas flow. The distal end portion of the housing may include a port that extends generally radially through the trailing side at the distal end portion so the port faces away from the combustion gas flow. The leading side of the housing at the distal end portion curves towards and terminates at the trailing side at the distal end portion and distally of the port. The leading side of the housing of the distal end portion may be convex for minimizing the heat transfer coefficient and to minimize the probability of hot combustion gases entering the port and damaging the sensor. The housing body may also include a continuous sidewall with a leading plenum extending through the sidewall along the leading side of the housing and between the proximal end and distal end portion of the housing. The continuous sidewall may further include a trailing plenum extending through the sidewall and along the trailing side of the housing between the proximal end of the housing and the port. Cooling air may be flowed through the leading and trailing plenums.

In another aspect, a method for measuring a temperature of combustion gases flowing through a turbine of a gas turbine engine is disclosed. The turbine is disposed within an engine case. The method may include coupling a proximal end of a temperature sensor assembly to the engine case at an upstream portion of the turbine. For example, the probe may be disposed within the stator vanes disposed upstream of the first stage rotor blades. A distal end of the temperature sensor assembly may be directed radially inwards from the engine case and into a flow path of combustion gases. The temperature sensor assembly may include an elongated housing that accommodates a sensor. The elongated housing may include a distal end portion. The method may further include sensing combustion gas temperatures through a port disposed in the distal end portion. The port may face away from the flow of combustion gases. The method may further include providing leading and trailing plenums in the housing wherein the leading plenum is disposed in a leading side of the housing that faces the flow of combustion gases and wherein the trailing plenum is disposed in a trailing side of the housing that, like the port, faces away from the flow of combustion gases. The leading plenum may provide communication between a cooling air source and film cooling holes disposed in the distal end portion of the housing. The trailing cooling plenum may provide communication between the cooling air source and the port. The method may further include flowing cooling air through the leading and trailing plenums.

In any one or more of the embodiments described above, the leading side of the distal end portion of the housing may be convex.

In any one or more of the embodiments described above, the sensor may include a proximal end and a distal end that at least partially overlaps the port.

In any one or more of the embodiments described above, the housing body may include a continuous sidewall with a leading plenum extending through the sidewall and between the proximal end and distal end portion of the housing. The leading plenum may be disposed generally diametrically opposite the port.

In any one or more of the embodiments described above, the leading plenum may in communication with a plurality of film cooling holes disposed in the leading side of the distal end portion of the housing.

In any one or more of the embodiments described above, the housing may further include a trailing plenum disposed in the trailing side of the housing and generally diametrically opposite from the leading plenum and extending through the sidewall between the proximal end of the housing and the port.

In any one or more of the embodiments described above, the leading and trailing plenums are in communication with a source of cooling air.

In any one or more of the embodiments described above, the housing body may include at least one side cavity disposed between the sidewall and the sensor. The at least one side cavity may be disposed between the leading and trailing plenums.

In any one or more of the embodiments described above, the housing body may include two side cavities disposed between the sidewall and the sensor. The two side cavities are disposed generally diametrically opposite from each other and each side cavity may be disposed between the leading and trailing plenums.

In any one or more of the embodiments described above, at least one of the side cavities is in communication with a source of cooling air. In a further refinement, where two side cavities are present, both side cavities may be in communication with the source of cooling air.

In any one or more of the embodiments described above, the housing may be coated with a thermal barrier coating.

DESCRIPTION

Figure 1:
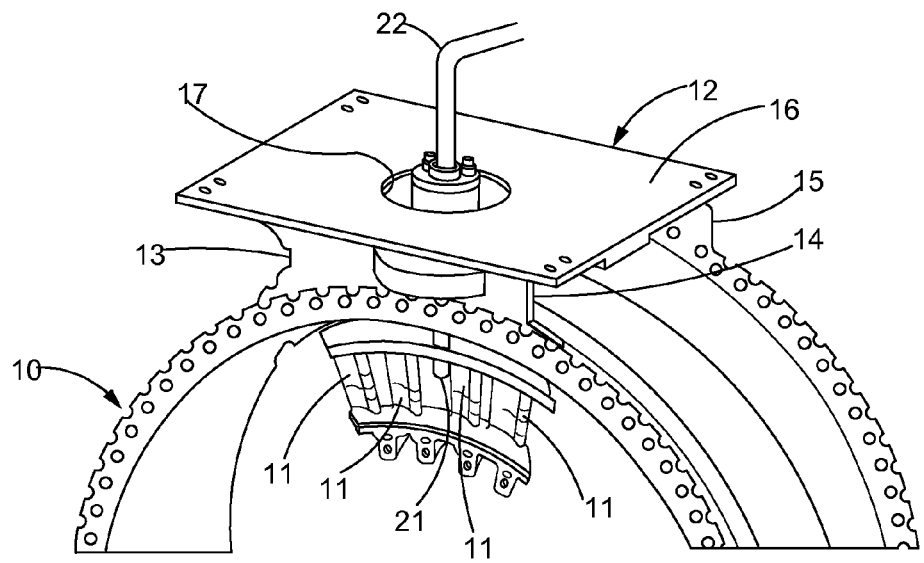
FIG. 1 is a partial perspective view of an engine case that surrounds a turbine, the upstream or first row of stator vanes of the turbine, a bracket for coupling a sensor assembly to the engine case and a cooling air supply that may be delivered to a sensor.
Figure 2:
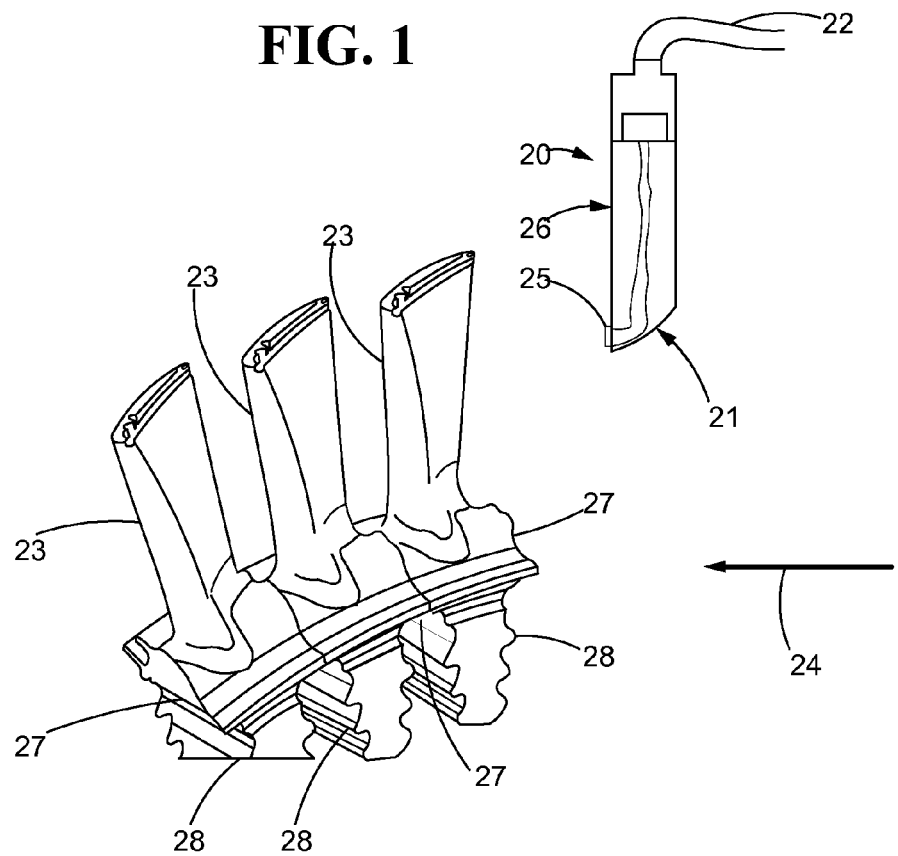
FIG. 2 is a partial rear perspective view illustrating a row of turbine blades and the spatial relationship between the sensor shown in FIG. 1 and the turbine blades, which are not shown in FIG. 1.

FIG. 1 shows a partial view of an engine case 10 that encircles a turbine, only parts of which are shown in FIGS. 1-2. In FIG. 1, a partial view of the upstream row of stator vane 11 is illustrated as coupled to an interior of the engine case 10. FIG. 1 also illustrates a bracket 12 that may include four legs, three of which are shown at 13, 14, 15 that connect the protective plate 16 to the engine case 10. The plate 16 may include an opening 17 through which a proximal end of a sensor assembly 20 (FIG. 2) protrudes. The distal end portion 21 of the sensor assembly 20 can be seen in FIG. 1. The sensor assembly 20, as shown in FIGS. 1-2 may also be connected to a conduit 22 which provides communication between the sensor assembly 20 and a cooling air supply as will be discussed below.

FIG. 2 shows a general spatial relationship between the disclosed sensor assembly 20 and the rotor blades 23 of the first stage of the turbine. The development of highly durable cooled sensor assemblies 20 make possible the effective measurement of engine cycle parameters within the power turbines which may lead to new control paradigms that may incorporate measurements made by such sensor assemblies 20 to optimally adjust engine parameters for a given speed or determining the health or the extent of wear of the turbine blades 23. The condition of the turbine blades 23 may be determined or estimated by measuring airfoil temperatures. However, to accommodate sensors in a turbine area of a gas turbine engine, cooling is required because the maximum operating temperatures of such sensors is typically hundreds to thousands of degrees lower than the temperature of the combustion gas flow, which is indicated schematically by arrow 24 in FIG. 1. FIG. 2 illustrates a different orientation but the direction of the combustion gas flow is also indicated by the arrow 24 in FIG. 2. The reader will note that the contoured distal end portion 21 of the sensor assembly 20 faces the combustion gas flow while a port 25 disposed in the sensor housing 26 faces away from the combustion gas flow as indicated by the arrow 24. Finally, still referring to FIG. 2, it will be noted that the rotor blades 23 are coupled to platforms 27 which, in turn, connect the rotor blades 23 to roots 28 which provide a dovetail connection to an inner case structure (not shown).

Figure 3:
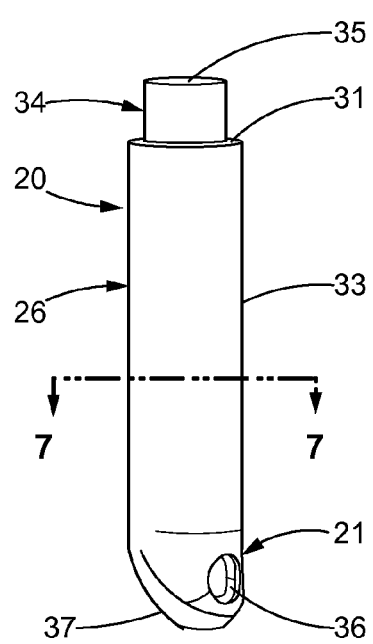
FIG. 3 is a plan view of the sensor assembly shown in FIGS. 1-2.
Figure 4:
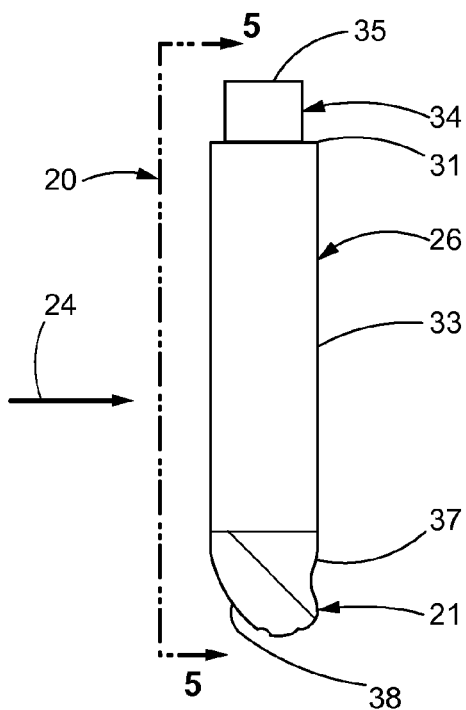
FIG. 4 is a side plan view of the sensor assembly shown in FIGS. 1-3.

Turning to FIGS. 3-4, a sensor assembly 20 that may include a housing 26 that may include a proximal end 31, a distal portion 21 and a housing body 33 disposed therebetween. The proximal end 31 may include an opening for receiving a sensor module or sensor 34. While the proximal end 35 of the sensor 34 is prominently shown in FIG. 3, the sensor 34 also includes a distal end 36 that may be seen through the port 37 that extends radially through the distal end portion 32 of the housing 26. The housing body 33 may be cylindrical for aerodynamic purposes. Further, the distal end portion 21 of the housing 26 may be specially designed to include a convex surface 38 that faces the combustion gas flow indicated by the arrow 24.

Figure 5:
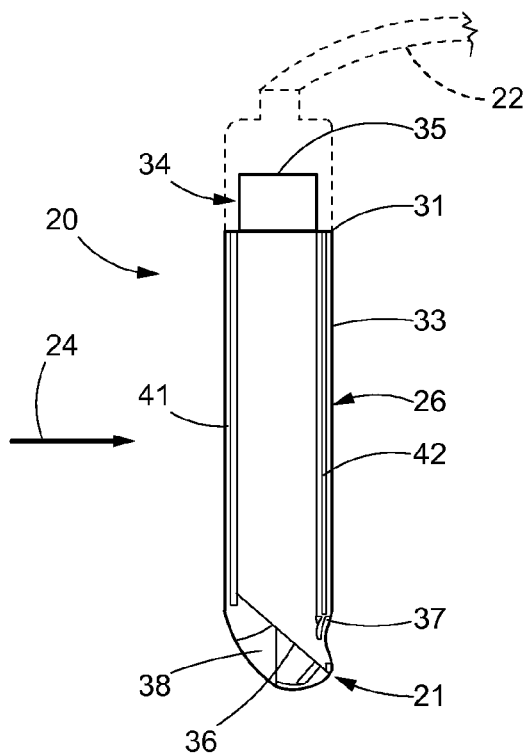
FIG. 5 is a sectional view taken substantially along line 5-5 of FIG. 4.

The convex surface 38 in the general contoured configuration of the leading side of the distal end portion 21 of the housing 26 minimizes the heat transfer coefficient by minimizing boundary layer tripping or interrupted boundary layers that may be associated with sharp edges. Hence, the distal end portion 21 of the housing 26 is contoured and has a curved profile from the leading side of the housing 26 that faces the arrow 24 as shown in FIG. 4 to the trailing side of the housing 26 that faces away from the combustion gas flow as indicated by the arrow 24. Due to the cylindrical nature of the housing body 33, the leading and trailing sides of the housing body 33 and the distal end portion 21 of the housing 26 do not include reference numerals. However, for purposes of clarity, it will be noted that the port 37 faces away from the combustion gas flow as indicated by the arrow 24 and therefore is disposed on the trailing side of the distal end portion 21 of the housing 26. The convex surface 38 as shown in FIG. 4 and FIG. 5 is disposed generally diametrically opposite the distal end portion 21 of the housing 26 and therefore is in general alignment with the leading side of the housing 26 and distal end portion 21. This will be further clarified below in connection with the description of FIGS. 5 and 7. Further, in addition to minimizing boundary layer tripping or boundary layer interruptions, the convex surface 38 that faces the combustion gas flow as indicated by the arrow 24 also reduces the possibility of hot combustion gases from entering the port 37 which may be caused by unsteady blade passing interactions with local recirculation zones created by flow separations around the sensor assembly 20.

Figure 6:
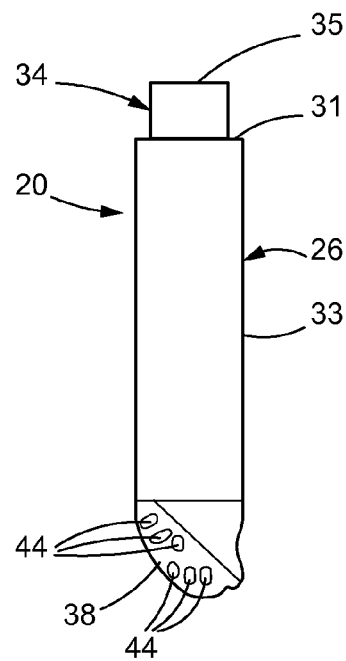
FIG. 6 is another plan view of the sensor assembly shown in FIGS. 1-5.

Turning to FIG. 5, the maximum operating temperature of a typical sensor 34 may be hundreds to thousands of degrees lower than the temperature of the combustion gas flow (see the arrow 24). Therefore, to accommodate the sensor 34, the housing 26 has been designed with a cooling system. Part of that cooling system is shown in FIG. 5 in the form of a leading plenum 41 and a trailing plenum 42. The leading plenum 41 is disposed along the leading side of the housing 26 that faces the combustion gas flow (see the arrow 24). In contrast, the trailing plenum 42 is in general alignment with the port 37. Both the leading plenum 41 and trailing plenum 42 may be in communication with the cooling air conduit 22. The leading plenum 41 may provide communication between the cooling air conduit 22 and the film cooling holes shown schematically at 44 in FIG. 6. The film cooling holes 44 may be disposed in the convex surface 38 of the distal end portion 21 of the housing 26. Thus, air travels from the air supply, through the conduit 22, through the leading plenum 41 and out through the film cooling holes 44.

Film cooling may be used to bleed air from the compressor stage and route at least some of that air through the conduit 22, through the plenum 41 and out through the film cooling holes 44. As a result, a thin, cool insulating blanket will flow along the convex surface 38 and past the port 37. Further, the trailing plenum 42 provides communication between the conduit 22 and the port 37. Because the trailing plenum 42 has a higher through flow, cooling air passing through the trailing plenum 42 and out through the port 37 provides a film of air to both cool and shield the distal end 36 of the sensor 34 (see FIG. 5) from the hot combustion gases and particulates carried in the combustion gas flow indicated by the arrow 24.

Figure 7:
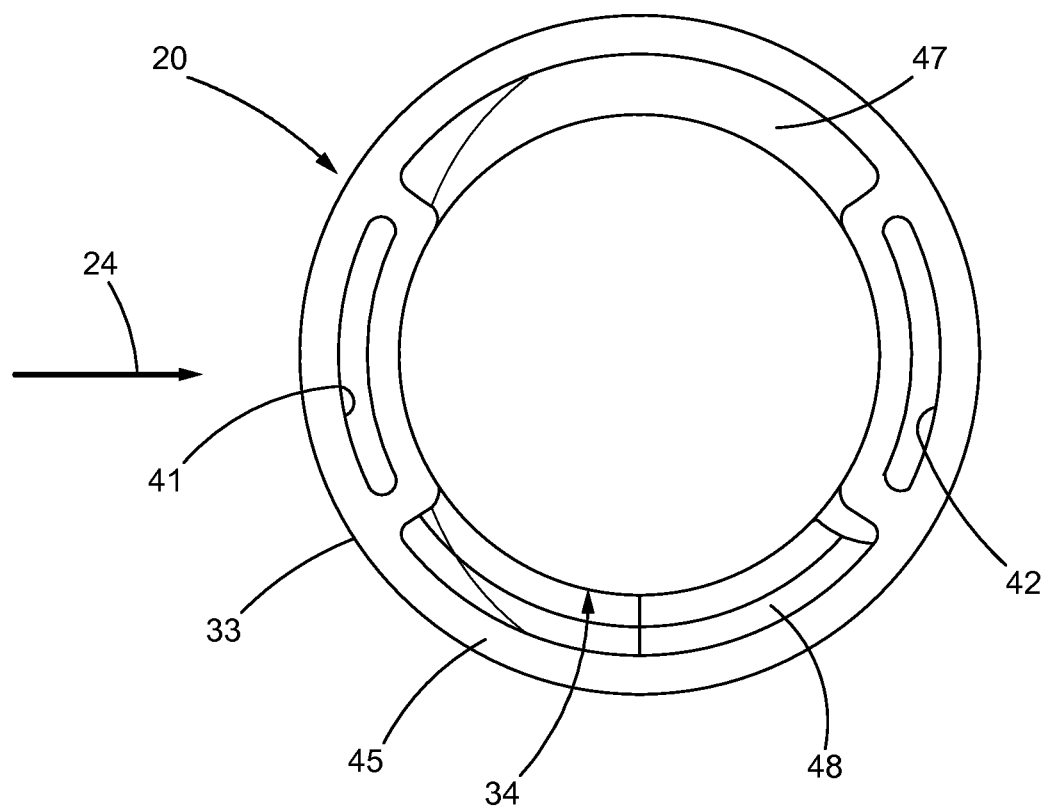
FIG. 7 is a sectional view taken substantially along line 7-7 of FIG. 3.

Turning to FIG. 7, a sectional view of the sensor assembly 20 is shown. The housing body 33 includes a continuous sidewall 45 through which the leading plenum 41 and trailing plenum 42 extend. Further, a pair of side cavities 47, 48 are disposed in the sidewall 45 and defined by the sidewall 45 and the sensor 34. The side cavities 47, 48 may also be in communication with the cooling air duct 22 provide slower velocity cooling to the lower heat-load portions of the sensor 34.

Thus, cooling air may be used by the sensor assembly 20 in a variety of ways including a cooling air flow through the leading plenum 41 and out through the film cooling holes 44. The placement and number of film cooling holes 44 may be optimized to tailor the sensor assembly 20 to its intended operating environment. Optimizing the number of film cooling holes 44 may result in effective cooling of the sensor 34 while minimizing possible corruption of the measurements made by the sensor 34 by extraneous amounts of cooling air in the flow path indicated by the arrow 24. Further, larger quantities of cooling air may be flowed through the trailing plenum 42 and out through the port 37 that faces away from the combustion gas air flow (see the arrow 24) which, by virtue of its higher through flow, provide a film of air to both cool and shield the distal end 36 of the sensor 34. Finally, additional cooling may be provided by air flowing into and out of the cavities 47, 48. The cavities 47, 48 do not have an exit port or film hole associated with them. However, small exit ports or film cooling holes could be utilized for the cavities 47, 48 as well.

INDUSTRIAL APPLICABILITY

Disclosed herein is a sensor assembly equipped with a housing having a cooling system that protects the enclosed sensor from the extremely harsh looking environment of a gas turbine engine, particularly downstream of the combustor. The aerodynamic contouring of the distal end portion which provides a convex surface for engaging the combustion gas flow minimizes heat loading to the sensor housing. Further, the aerodynamic contouring of the distal end portion of the housing minimizes the possibility of combustion gases entering the port that faces away from the combustion gas flow and through which the distal end of the sensor detects operating temperatures via infrared technology. IR temperature sensors are known to those skilled in the art.

The housing is equipped with a leading cooling plenum disposed on a side of the housing that faces the combustion gas flow as well as a trailing cooling plenum that faces away from the combustion gas flow. The leading cooling plenum provides highly effective impingement cooling to the leading side of the sensor housing and therefore the portion of the sensor housing with the highest heat load location. The trailing cooling plenum provides an aerodynamic heat shield and a film of cooling air to protect the distal end of the sensor from combustion gas path temperatures and particulates. The additional side cavities that are disposed diametrically opposite the housing from one another and each of which are disposed between the leading and trailing plenums, provide active cooling to the sensor and housing and minimize any heat conduction path to the sensor.

The use of film holes on the distal end portion as an outlet for the leading plenum cooling airflow may be optimized to minimize measurement air from the cooling airflow. Finally, the housing may be coated with a thermal barrier coating. The thermal barrier coating may include three layers, not including the housing which serves as a metal substrate. The three additional layers include a metallic bond coat, a thermally grown oxide and a ceramic top coat, as will be apparent to those skilled in the art. The thermal barrier coating may be applied using conventional technology such as electron beam physical vapor deposition (EBPVD), air plasma spray (SPS), high velocity oxygen fuel (HVOF), electrostatic spray assisted vapor deposition (ESAVD) and/or direct vapor deposition. The ceramic top coat may be a yttria-stabilized zirconia (YSZ), or other suitable materials as will be apparent to those skilled in the art.

The invention claimed is:

1. A sensor assembly comprising:
an elongated housing including a proximal end and a distal end portion with a housing body disposed therebetween, the proximal end including an opening for accommodating a sensor, the sensor extending through the housing body to the distal end portion of the housing,
the distal end portion of the housing including a port extending generally radially through a trailing side of the distal end portion, the distal end portion including a leading side disposed diametrically opposite the port and the trailing side of the distal end portion, and the leading side of the distal end portion curving towards and terminating at the trailing side of the distal end portion and distally of the port,
the housing body includes a continuous sidewall with a leading plenum extending through the sidewall between the proximal end and the distal end portion of the housing, the leading plenum being disposed generally diametrically opposite the port, the housing body further includes a trailing plenum disposed generally diametrically opposite the leading plenum and extending through the sidewall between the proximal end of the housing and the port.

2. The sensor assembly of claim 1 wherein the leading side of the distal end portion of the housing is convex.

3. The sensor assembly of claim 1 wherein the sensor includes a proximal end and a distal end that at least partially overlaps the port.

4. The sensor assembly of claim 1 wherein the leading plenum is in communication with a plurality of film cooling holes disposed in the leading side of the distal end portion of the housing.

5. The sensor assembly of claim 1 wherein the leading and trailing plenums are in communication with a source of cooling air.

6. The sensor assembly of claim 1 wherein the housing body includes at least one side cavity disposed between the sidewall and the sensor, the at least one side cavity being disposed between the leading and trailing plenums.

7. The sensor assembly of claim 6 wherein the at least one side cavity is in communication with a source of cooling air.

8. The sensor assembly of claim 1 wherein the housing body includes two side cavities disposed between the sidewall and the sensor, the two side cavities being disposed generally diametrically opposite from each other and each side cavity being disposed between the leading and trailing plenums.

9. The sensor assembly of claim 8 wherein the two side cavities are in communication with a source of cooling air.

10. The sensor assembly of claim 1 wherein the housing body further includes a trailing plenum extending through the sidewall between the proximal end of the housing and the port.

11. The sensor assembly of claim 1 wherein the housing is coated with a thermal barrier coating.

12. The sensor assembly of claim 1 wherein the housing is coated with a thermal barrier coating.

13. A sensor assembly for a turbine of a gas turbine engine, the sensor assembly comprising:
an elongated housing including a proximal end and a distal end portion with a housing body disposed therebetween, the proximal end including an opening for accommodating a sensor, the sensor axially extending through the housing body to the distal end portion of the housing, the elongated housing including a leading side for engaging combustion gas flow and a trailing side that faces away from the combustion gas flow,
the distal end portion of the housing including a port extending generally radially through the trailing side of the housing in the distal end portion, the leading side of the housing at the distal end portion curving towards and terminating at the trailing side at the distal end portion and distally of the port, the leading side of the housing at the distal end portion being convex, and
the housing body including a continuous sidewall with a leading plenum extending through the sidewall along the leading side of the housing and between the proximal end and the distal end portion of the housing, the continuous sidewall further including a trailing plenum extending through the sidewall along the trailing side of the housing between the proximal end of the housing and the port.

14. The sensor assembly of claim 13 wherein the sensor includes a proximal end and a distal end that at least partially overlaps the port.

15. The sensor assembly of claim 13 wherein the leading plenum is in communication with a plurality of film cooling holes disposed in the leading side of the housing at the distal end portion of the housing.

16. The sensor assembly of claim 13 wherein the first and trailing plenums are in communication with to a source of cooling air.

17. The sensor assembly of claim 13 wherein the housing body includes two side cavities disposed between the sidewall and the sensor, the two side cavities being disposed generally diametrically opposite from each other and each side cavity being disposed between the leading and trailing plenums.

18. The sensor assembly of claim 17 wherein the two side cavities are in communication with a source of cooling air.

19. A method for measuring a temperature of combustion gases flowing through a turbine of a gas turbine engine, the turbine being disposed within an engine case, the method comprising:

coupling a proximal end of a temperature sensor assembly to the engine case at an upstream portion of the turbine and directing a distal end of the temperature sensor assembly radially inwards from the engine case and into a flow path of combustion gases, the temperature sensor assembly including an elongated housing that accommodates a sensor, the elongated housing including a distal end portion and leading and trailing plenums in the housing wherein the leading plenum is disposed in a leading side of the housing that faces the flow of combustion gases and wherein the trailing plenum is disposed in a trailing side of the housing that faces away from the flow of combustion gases, the leading plenum providing communication between a cooling air source and film cooling holes disposed in the distal end portion of the housing, the trailing cooling plenum providing communication between the cooling air source and the port;

sensing combustion gas temperatures through a port disposed in the distal end portion, wherein the port faces away from a flow of the combustion gases; and flowing cooling air through the leading and trailing plenums.

* * * * *